(12) United States Patent
Guellec

(10) Patent No.: US 12,403,755 B2
(45) Date of Patent: Sep. 2, 2025

(54) ENCAPSULATED FIXED WINDOW MODULE FOR A MOTOR VEHICLE

(71) Applicant: Hutchinson Sealing Systems, Inc., Auburn Hills, MI (US)

(72) Inventor: André Guellec, Bloomfield Hills, MI (US)

(73) Assignee: HUTCHINSON SEALING SYSTEMS, INC., Auburn Hills, MI (US)

( * ) Notice: Subject to any disclaimer, the term of this patent is extended or adjusted under 35 U.S.C. 154(b) by 451 days.

(21) Appl. No.: 17/968,726

(22) Filed: Oct. 18, 2022

(65) Prior Publication Data

US 2024/0123803 A1 Apr. 18, 2024

(51) Int. Cl.
| | |
|---|---|
| *B60J 10/777* | (2016.01) |
| *B60J 1/10* | (2006.01) |
| *B60J 10/76* | (2016.01) |
| *B60J 10/78* | (2016.01) |
| *B60J 10/79* | (2016.01) |

(52) U.S. Cl.
CPC ............... *B60J 10/777* (2016.02); *B60J 1/10* (2013.01); *B60J 10/76* (2016.02); *B60J 10/78* (2016.02); *B60J 10/79* (2016.02)

(58) Field of Classification Search
CPC ... B60J 1/10; B60J 10/777; B60J 10/76; B60J 10/78; B60J 10/79
See application file for complete search history.

(56) References Cited

U.S. PATENT DOCUMENTS

| | | | | |
|---|---|---|---|---|
| 4,653,230 A | * | 3/1987 | Seo | B60J 10/79 49/374 |
| 4,662,113 A | * | 5/1987 | Weaver | B60J 10/79 49/404 |
| 4,932,161 A | * | 6/1990 | Keys | B60J 10/32 49/374 |

(Continued)

FOREIGN PATENT DOCUMENTS

| | | |
|---|---|---|
| EP | 0195578 A1 | 8/1990 |
| EP | 3623191 A1 | 3/2020 |

OTHER PUBLICATIONS

European Extended Search Report received for EP Serial No. 23202991 on Feb. 26, 2024, 2 pgs.

*Primary Examiner* — Jason S Morrow
(74) *Attorney, Agent, or Firm* — Merchant & Gould P.C.

(57) ABSTRACT

An encapsulated fixed window module for a motor vehicle includes a fixed window pane, a first division post profile defining a longitudinal groove configured to receive a guide carried by a movable window pane, and having an exterior wall facing a fixed pane interior surface. An over-molded material secures the first division post profile to the fixed window pane, the over-molded material includes a first over-molded portion extending between the division post exterior wall and the fixed pane interior surface and a second over-molded portion extending between the lateral wall and the interior surface. The first over-molded portion has a first thickness which is constant along a major portion of the first over-molded portion. The second over-molded portion has a second thickness which is constant along a major portion of the second portion due to a co-extruded feature on the first division post profile.

18 Claims, 9 Drawing Sheets

(56) References Cited

U.S. PATENT DOCUMENTS

| | | | | |
|---|---|---|---|---|
| 5,846,463 | A * | 12/1998 | Keeney | B29C 70/84 |
| | | | | 264/261 |
| 6,220,650 | B1 * | 4/2001 | Davis | B60J 10/78 |
| | | | | 296/146.16 |
| 6,571,513 | B2 * | 6/2003 | Maass | B60J 10/78 |
| | | | | 49/440 |
| 6,643,984 | B2 * | 11/2003 | Kato | B60J 10/50 |
| | | | | 52/204.597 |
| 10,457,121 | B2 * | 10/2019 | Tallent | B60J 10/78 |
| 11,059,360 | B2 * | 7/2021 | Guellec | B60J 10/79 |
| 11,780,300 | B2 * | 10/2023 | Hatta | B60J 5/0402 |
| | | | | 49/404 |
| 12,179,562 | B2 * | 12/2024 | Baratin | B60R 13/04 |
| 2024/0399843 | A1 * | 12/2024 | Guellec | B60J 10/76 |

\* cited by examiner

A1-A1

A2-A2

C-C

B-B

ENCAPSULATED FIXED WINDOW MODULE FOR A MOTOR VEHICLE

TECHNICAL FIELD

The present invention relates generally to an encapsulated fixed window module for a motor vehicle and such a motor vehicle.

BACKGROUND OF THE INVENTION

In a number of motor vehicles, a door assembly is designed such that there is a first, e.g., forward, window opening that carries a movable window pane and a second, e.g., rearward, opening that is equipped with a fixed or stationary window pane. Of course, the forward window pane may be fixed and the rearward window pane may be moveable. Fixed windows of conventional design may be assembled from discrete elements that include the window panel, a post that serves as a track for an adjacent movable window and various configurations of moldings or trim pieces or division posts, most specifically an extruded header/B-pillar trim piece that may be mechanically attached to the window module assembly using an interlocking channel or the like.

The division post in some prior art designs comprises an article in the nature of a pre-formed resilient band. In those designs, the window is inserted into a channel of the trim band which resiliently engages the window pane, but often less than securely. Conventional designs suffer from a number of deficiencies due to their assembly from discrete components such as water leakage, noise from the exterior (wind noise) or the interior, and problems generally with fit and finish. In addition, the assembly of these modules is often difficult, particularly where the individual components are manufactured by more than one supplier.

A few of the problems of conventional designs are overcome through the use of over-molding processes by which a portion of the trim or post surrounding the window pane is fabricated by encapsulating the window periphery with a polymer using injection molding techniques. In essence, the window pane is placed in a mold cavity which is configured to produce a circumferential trim at the pane edges. A division post profile and a header profile are also placed in the mold cavity. In some case, an additional margin seal extrusion can be added to the mold cavity. The edges of the pane on which the injection molded trim will adhere are cleaned and primed to promote adhesion and to create a water-impervious seal in the formed article. The mold is then closed and the material is injected such that the window pane edges are encapsulated to form the desired trim geometry.

FIG. 1 is a cross sectional view of adjacent window panes 1, 2 of a motor vehicle. The window pane 1 is fixed and the window pane 2 is movable. The fixed window pane 1 has an exterior surface 1a, an interior surface 1b, and a peripheral edge 1c extending between said exterior and interior surfaces 1a, 1b. A division post 3 extends along the peripheral edge 1c and is secured thereto by an over-molded material 4.

The division post 3 is U-shaped in cross section and has an exterior wall 3a, an interior wall 3b, and a lateral wall 3c connecting said exterior and interior walls 3a, 3b. The division post 3 defines a longitudinal groove 5 configured to receive a portion of the movable window pane 2. The lateral wall 3c of the division post 3 is in abutment against the peripheral edge 1c of the fixed window pane 1 and said over-molded material 4 comprises a first portion 4a extending between the lateral wall 3c and the exterior surface 1a, and a second portion 4b extending between the lateral wall 3c and the interior surface 1b.

This configuration creates a small offset O between the interior surface 1b and the interior wall 3b and requires limited amount of over-molded material on both sides of the fixed window pane 1. The risk of appearance issue due to sink marks is therefore low.

The exterior appearance of the window modules is very important for the customer, i.e., the user of the motor vehicle. A solution for enhancing the appearance of a window module is to provide the periphery of the window pane with finished panels which are located outside the motor vehicle and are visible by the user. Said finished panels are for instance esthetic metal components which are secured to the window module.

It is also known to enhance the esthetic appearance of a window module by lying flush the outside of its stationary window pane with the outside of an adjacent movable window pane.

FIG. 2 is a cross sectional view of adjacent and flush window panes 1, 2 of a motor vehicle. The division post 3 extends along the peripheral edge 1c and is secured to the interior surface 1b by an over-molded material 4.

The division post 3 defines a longitudinal groove 5 configured to receive a guiding mean 6 carried by the movable window pane 2. The exterior wall 3a of the division post 3 faces the interior surface 1b and is secured thereto by the over-molded material 4.

The over-molded material 4 comprises a first portion 4a extending between the exterior wall 3a and the interior surface 1b and a second portion 4b extending between the lateral wall 3c and the interior surface 1b. FIG. 2 shows that the first portion 4a has a thickness E1 which is constant (the thickness, E1 being measured in a direction D1 perpendicular to the interior surface 1b and/or to the exterior wall 3a). On the contrary, the second portion 4b has a bigger thickness E2 which is not constant and which varies (the thickness, E2 is measured in a direction D2 perpendicular to the lateral wall 3c). The thickness E2 of the second portion 4b is higher in the proximity of the interior surface 1b than on the opposite end in the proximity of the interior wall 3b.

The over-molded material 4 comprises an outer face 4c which extends between the lateral wall 3c and the interior surface 1b and which includes a major portion 4c1 which is inclined with respect to the interior surface 1b. Due to feasibility reasons, it is not possible to get a major portion 4c1 perpendicular to the interior surface 1b during the over-molding process.

In this flush configuration, a large offset O is created between the interior surface 1b and the interior wall 3b and a large amount of over-molded material 4 is needed to fill this offset O. The risk of appearance issue due to sink marks is therefore high. Indeed, after de-molding, the over-molded material 4 cools and hardens. The large amount of over-molded material promotes the formation of sink marks and surface defects on the outer face 4c. Since this outer face 4c may be visible to the user of the motor vehicle, these sink marks and surface defects are problematic.

The present invention provides at least an encapsulated fixed window module which can be used in a flush configuration and which avoids the above-mentioned appearance issue of the over-molded material.

SUMMARY OF THE INVENTION

According to the invention there is provided an encapsulated fixed window module for a motor vehicle, comprising:

a fixed window pane having an exterior surface, an interior surface, and a peripheral edge extending between said exterior and interior surfaces, at least one division post extending along at least a portion of said peripheral edge, said division post comprising a first longitudinal profile which is U-shaped in cross section and which has an exterior wall, an interior wall, and a lateral wall connecting said exterior and interior walls, said first profile defining a longitudinal groove configured to receive a guiding mean carried by a movable window pane, said exterior wall facing said interior surface, and an over-molded material securing said first profile to said fixed window pane, said over-molded material comprising a first portion extending between said exterior wall and said interior surface and a second portion extending between said lateral wall and said interior surface, said first and second portions being connected one to the other, said first portion having a first thickness which is constant along a major portion of said first portion, said second portion having an outer face which extends between the lateral wall and said interior surface and which includes a major portion which is inclined with respect to said interior surface, wherein said second portion has a second thickness which is constant along a major portion of said second portion.

In the present specification, the words "inner", "inside", "interior", etc., make reference to the inside of a motor vehicle. The words "outer" "outside", "exterior", etc., make reference to the outside of the motor vehicle. Then, an outer element is located at the outer side of the vehicle. A first outer element, portion or surface may be visible by a user of the motor vehicle or may be hidden by a second outer element, portion or surface covering said first outer element.

In the present specification, "aligned" and "substantially aligned" mean that two elements are strictly aligned or are aligned in a range 0 to 5 mm, preferably 0 to 3 mm and more preferably 0 to 1 mm.

The present invention provides a solution for enhancing the esthetic appearance of a fixed window module. This aim is achieved by keeping the thickness of the over-molded material as constant as possible. The second portion of the over-molded material is constant along a major portion of this second portion along a direction perpendicular to the interior surface of the fixed window pane. The thicknesses of the first and second portions of the over-molded material may be similar. Having a consistent thickness allows all the molded areas to cool at the same speed and prevent "sink-marks" and other appearance defects.

The encapsulated fixed window module according to the invention may comprise one or more of the following features, taken alone from each other or in combination with each other:
- said lateral wall comprises a tooth which includes a first surface parallel to said interior surface, and a second surface which is inclined with respect to said interior surface, said first portion extending between said first surface and said interior surface and said second portion extending between said second surface and said interior surface;
- said first profile is extruded;
- said tooth is co-extruded with said first profile;
- said first surface is planar and said second surface is planar or curved;
- said second surface is concave or convex;
- said second surface is mainly parallel to said outer surface or provides a constant offset when this second surface is concave or convex;
- said first and second surfaces are V-shaped in cross section;
- said tooth has a tip having an angle comprises between 20 and 85°, and preferably between 50 and 70°;
- said over-molded material is V-shaped;
  - said over-molded material includes a protruding rib extending on the interior surface;
- said exterior wall comprises a longitudinal end opposite said lateral wall, said longitudinal end comprising a protruding leg which is perpendicular to the exterior wall and is in abutment against said peripheral edge;
- said protruding leg carries a first sealing lip which is configured to abut against a peripheral edge of said movable window pane;
- said longitudinal end and/or said exterior wall carries a protruding lip which abuts against said interior face and which is in contact with said over-molded material; said protruding lip is advantageous because it is used as a mold shut off between the fixed pane and the first profile;
- an empty space is defined between said fixed window pane on one hand, and said protruding leg and lip on the other hand;
- $0.8 \cdot E1 \leq E2 \leq 1.2 \cdot E1$; and preferably $0.9 \cdot E1 \leq E2 \leq 1.1 \cdot E1$ and more preferably $E1=E2$; $E1$ and $E2$ being respectively said first and second thicknesses;
- said first profile comprises an embedded metallic rail which includes a leg extending outwardly and facing said peripheral edge;
  - the thicknesses of the first and second portions are constant along a major portion of a length of the first profile;
  - the thickness of the first portion is measured in a direction which is perpendicular to the interior surface of the fixed window pane; this direction may be perpendicular to said exterior wall or to a surface of said exterior wall;
  - the thickness of the second portion is measured in a direction which is perpendicular to said lateral wall or to a surface of said lateral wall;
  - the thickness of the first portion is substantially constant when the first profile is viewed in cross section;
  - the thickness of the second portion is constant when the first profile is viewed in cross section;
- said over-molded material does not cover said peripheral edge along said first profile;
- said exterior wall of said first profile is applied onto said interior surface;
- said exterior wall is L-shaped in cross section and includes first and second parts that are perpendicular one another, said first part being spaced from said interior surface and extending between said lateral wall and said second part, said second part being applied directly onto said interior surface;
- said first part defines a space with said interior surface that is filled in with said over-molded material;
- said over-molded material extends at least between said exterior and lateral walls and said interior surface;
- said interior wall faces said guiding mean and an interior surface of said movable window pane;
- said interior wall carries a second sealing lip which is configured to be in sealing contact with said guiding mean;

said interior wall carries a third sealing lip which is configured to be in sealing contact with said movable window pane;

said exterior wall is coated with an antifriction layer inside said longitudinal groove;

said lateral wall is coated with an antifriction layer inside said longitudinal groove;

said interior wall is coated with an antifriction layer inside said longitudinal groove;

said module further comprises a second longitudinal profile which is U-shaped in cross section and which has an exterior wall connecting therebetween two lateral walls, said second profile defining a longitudinal groove configured to receive a metallic flange of the motor vehicle;

said exterior wall of said second profile is parallel to said interior surface and is secured thereto by an over-molded material, one of said lateral walls of said second profile being substantially aligned with a portion of said peripheral edge in a plane that is perpendicular to said fixed window pane, and the other of said lateral walls of said second profile extending perpendicularly and facing said interior surface;

said exterior wall of said second profile is spaced from said interior surface;

said module further comprises a third longitudinal profile which connects therebetween first and second longitudinal profiles;

said module further comprises a third longitudinal profile which extends along at least an upper portion of said peripheral edge of said fixed window pane, and which is adjacent to said profile;

said third longitudinal profile comprises first and second U-shaped portions, said first U-shaped portion being configured to receive a metallic flange of the motor vehicle and the second U-shaped portion being configured to receive by sliding said movable window pane;

said first and second U-shaped portions define respectively two longitudinal grooves which are perpendicular one another;

said over-molded material further comprises a third portion which is connected to the first portion and which is interposed between said leg and said peripheral edge;

said over-molded material further comprises a third portion which is connected to the first portion, said third portion extending perpendicularly to the first portion and on said peripheral edge;

said third portion includes an end which is coplanar with said exterior surface of said fixed window pane;

the (co-extruded) material of the tooth is different from the (co-extruded) material of the first longitudinal profile;

the (co-extruded) material of the protruding lip is different from the (co-extruded) material of the first longitudinal profile;

the (co-extruded) material of the protruding leg is different from the (co-extruded) material of the first longitudinal profile;

the material(s) of the tooth, and/or the protruding leg, and/or the protruding lip is/are softer or less hard than the material of the first longitudinal profile and in particular a covering material of this first longitudinal profile.

The invention further proposes a motor vehicle, comprising at least one encapsulated fixed window module as defined above.

The motor vehicle may comprise a door including a door frame, a movable window pane, and said encapsulated fixed window module, said movable window pane having an exterior surface, an interior surface, and a peripheral edge extending between said exterior and interior surfaces, wherein said exterior surfaces of said encapsulated fixed window module and of said movable window pane are substantially coplanar.

BRIEF DESCRIPTION OF THE FIGURES

The invention will be better understood and other details, features and advantages of the invention will appear more clearly on reading the following description given by way of non-limiting examples and with reference to the accompanying drawings in which.

MORE DETAILED DESCRIPTION

Figure 1:
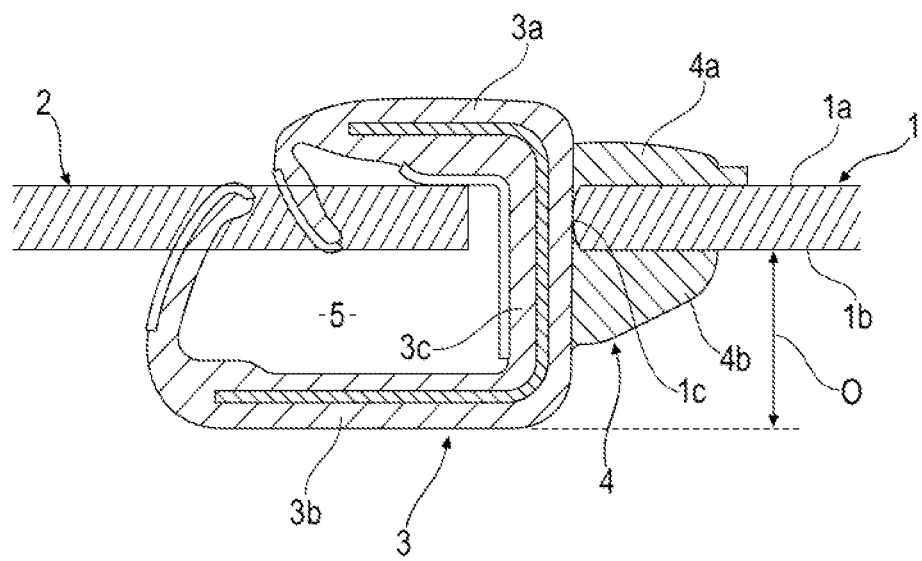
FIG. 1 is a cross sectional view of adjacent window panes including a fixed window pane carrying a division post, and a movable window pane guided into a groove of the division post.
Figure 2:
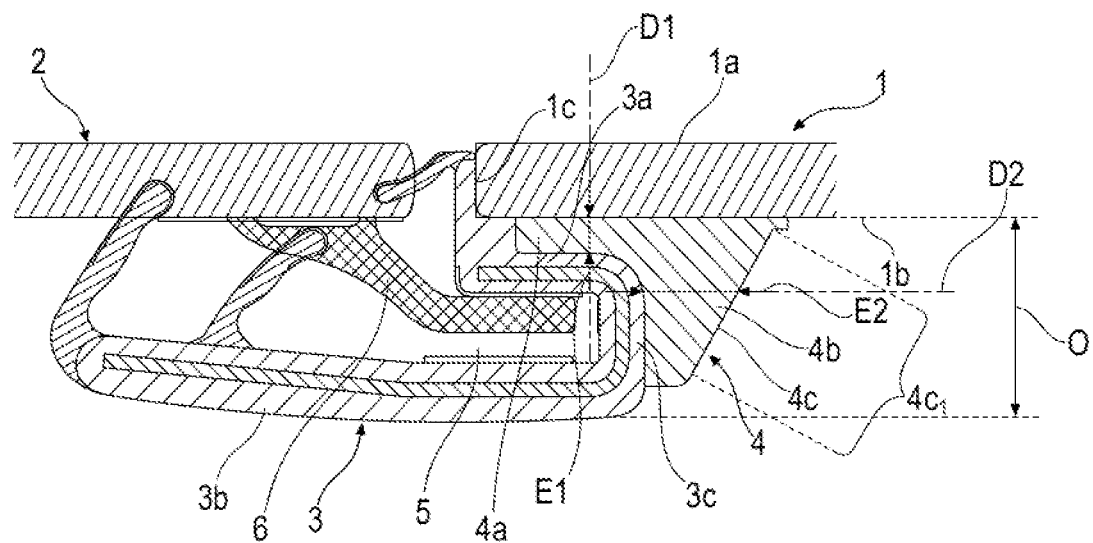
FIG. 2 is a cross sectional view of adjacent and flush window panes including a fixed window pane carrying a division post, and a movable window pane carrying a guiding mean engaged into a groove of the division post.

FIGS. 1 and 2 have been already described and illustrate the prior art.

Figure 3:
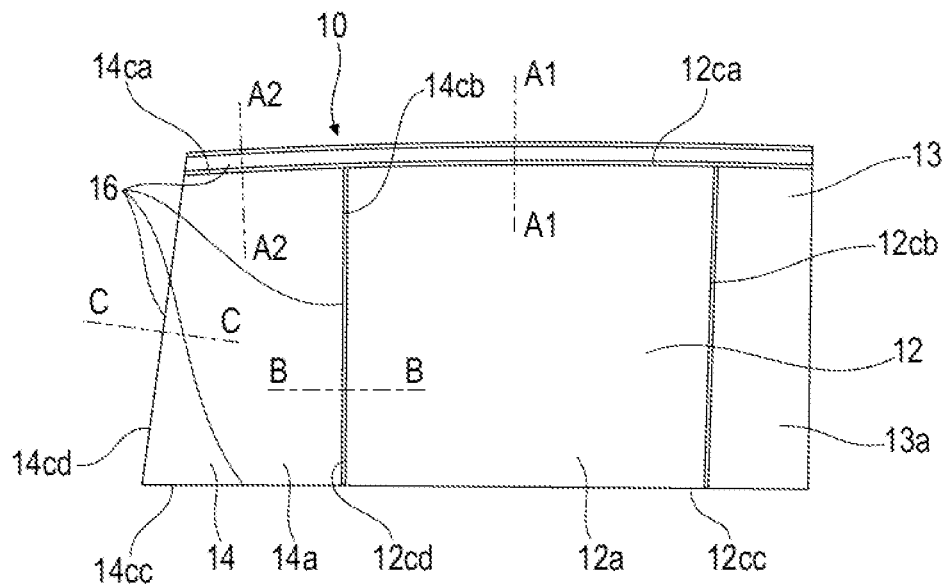
FIG. 3 is a fragmentary side view of an encapsulated fixed window module.

FIG. 3 shows an example of an encapsulated fixed window module 10 for a motor vehicle.

A motor vehicle door comprises a door frame provided with an encapsulated fixed window module 10 which can be adjacent to a movable window pane 12. In the example of FIG. 1, a rear door of a vehicle is shown in which case the pane 12 is a forward pane and the module 10 is a rearward module. Another configuration would be on a front door, with in that case the movable window pane 12 positioned rearwardly from the module 10.

The module 10 includes at least a fixed window pane 14 molded on up to four extremities or along four edges. The or each molding forms an encapsulation 16.

Figure 4:
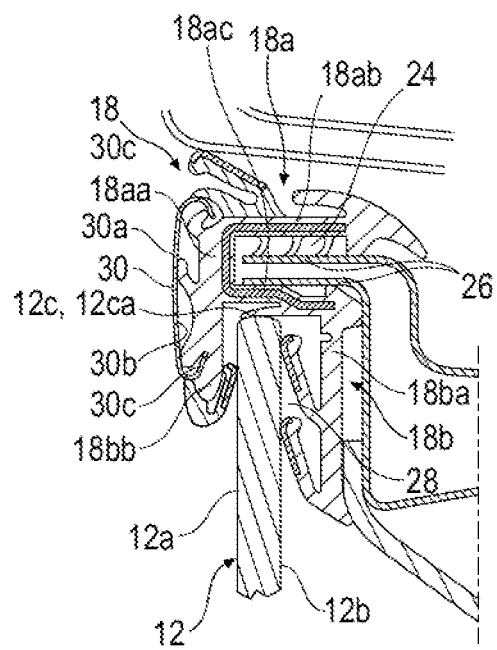
FIG. 4 is a cross sectional view along line A1-A1 of FIG. 3.
Figure 6:
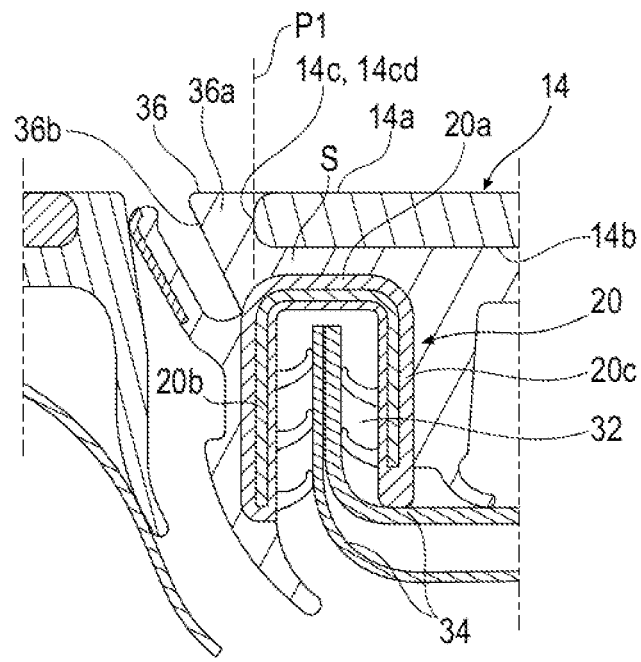
FIG. 6 is a cross sectional view along line C-C of FIG. 3.

Each pane 12, 14 has an exterior surface 12*a*, 14*a* intended to be located outside the motor vehicle, an interior surface 12*b*, 14*b* intended to be located inside the motor vehicle, and a peripheral edge 12*c*, 14*c* extending between said exterior and interior surfaces (see FIGS. 4 and 6).

Figure 5:
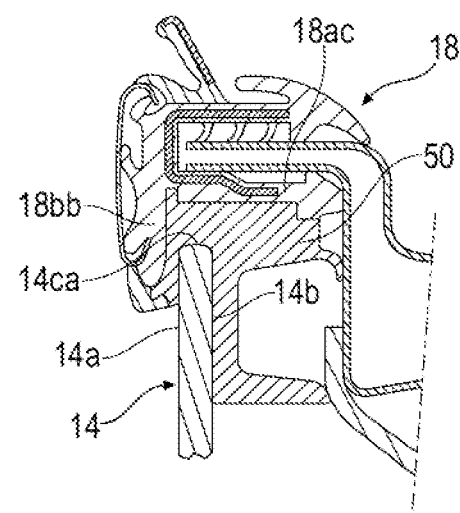
FIG. 5 is a cross sectional view along line A2-A2 of FIG. 3.

Each pane 12, 14 may be substantially flat. Thus, its surfaces 12a, 14a, 12b, 14b may be substantially flat. Of course, the pane 12, 14 and its surfaces may be slightly curved according to the expected design of the module. As shown in FIGS. 4 to 6, the peripheral edge 12c, 14c may have a cross sectional convex shape.

In the example shown, each pane 12, 14 has a polygonal shape and comprises four longitudinal edges. Each peripheral edge 12c, 14c includes therefore a top edge 12ca, 14ca, a front edge 12cb, 14cb, a bottom edge 12cc, 14cc and a rear edge 12cd, 14cd (see FIG. 3).

The door may further comprise an appliqué 13, the movable window pane 12 being located between the stationary window pane 14 and the appliqué 13. The exterior surface 12a of the pane 12 is advantageously flush with the exterior surface 14a of the pane 14a and the exterior surface 13a of the appliqué 13.

Figure 7:
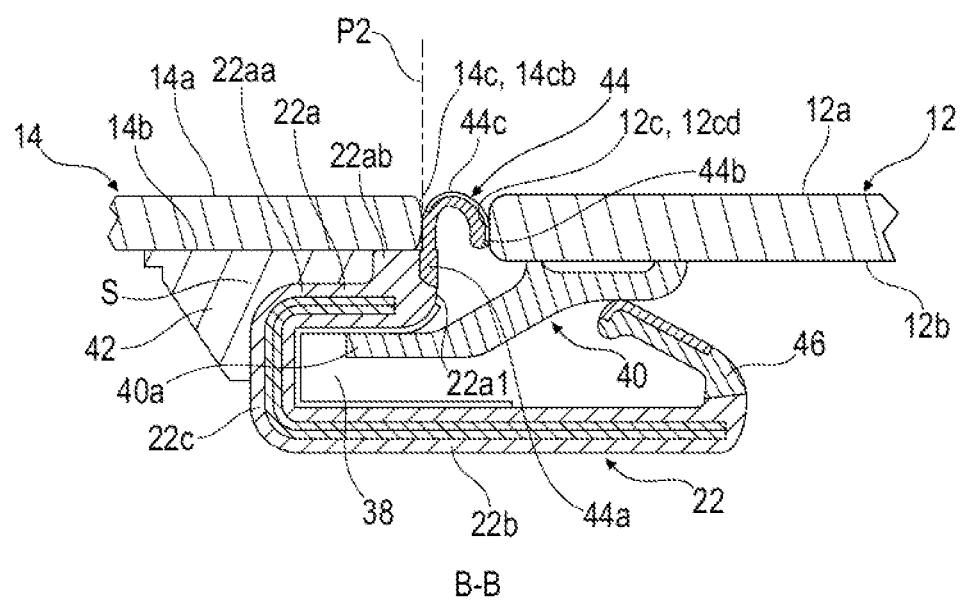
FIG. 7 is a cross sectional view along line B-B of FIG. 3.

FIG. 4 is a cross sectional view at the top edge 12ca of the movable window pane. FIG. 5 is a cross sectional view at the top edge 14ca of the fixed window pane. FIG. 6 is a cross sectional view at the rear edge 14cd of the fixed window pane. FIG. 7 is a cross sectional view at the front edge 14cb of the fixed window pane and at the rear edge 12cd of the movable window pane 12.

These figures show that the encapsulation 16 extends along the edges 14ca, 14cb and 14cd of the pane 14. Glass edge 14ca and the inboard side of the glass next to 14cb are encapsulated. Encapsulation of glass edges 14cd and 14cc is optional.

Thus, the encapsulation 16 extends along at least two edges of the pane 14 in the example shown but may not necessarily cover these edges as will be detailed below. The encapsulation 16 may comprise segments or profiles or division posts each extending along a portion of the longitudinal edges of the pane 14. Each profile of the division post has a length and a width, its length being greater than its width and extending along said portion of the longitudinal edges of the pane 14.

FIG. 4 shows a longitudinal profile which is called "third" profile 18. This third profile 18 extends along said edges 14ca and 12ca. The portion of the profile 18 shown in FIG. 4 is the one extending along the edge 12ca and is not over-molded.

A substantially vertical profile (not shown) is molded to profile 18 to be part of module 10, in order to guide the moveable glass edge 12cb.

The third profile 18 shown in FIG. 4 has first and second U-shaped portions 18a, 18b in cross section.

The first U-shaped portion 18a defines a longitudinal groove 24 that is oriented inwardly and is configured to receive a metallic flange 26 of the motor vehicle. In the example shown, the metallic flange includes two substantially horizontal panels that are superimposed and inserted into the groove 26. The first portion 18a includes an exterior wall 18aa connecting two lateral walls 18ab, 18ac defining the groove 26 therebetween.

The second U-shaped portion 18b defines a longitudinal groove 28 that is oriented downwardly in a plane parallel to the panes 12, 14 and which is configured to receive by sliding an upper portion of the movable window pane 12. The second portion 18b includes an interior wall 18ba and an exterior wall 18bb connected by a lateral wall which may be integrated in said lateral wall 18ac as shown in the figure. The walls of the second portion 18b define said groove 28.

Both portions 18a, 18b include sealing lips intended to cooperate with the pane 12 and/or parts of the vehicle.

The third profile 18 further may include an elongated esthetic component 30 which extends along the profile 18 and is secured onto both portions 18a, 18b. The component 30 includes an esthetic exterior face 30a and an interior face 30b. The component 30 includes a substantially flat portion including the faces 30a, 30b and longitudinal hooks 30c extending inwardly from the inner face 30b. The hooks 30c are used to mechanically secure the component 30 onto the profile 18. The component 30 is intended to cover at least portions of said exterior walls 18aa, 18bb which both comprise grooves intended to receive the hooks 30c by snap fitting.

FIG. 5 still shows the third profile 18 and in particular its portion extending along the edge 14ca and is over-molded.

This portion of the profile 18 differs from the portion of FIG. 2 in that it does not comprise the interior wall 18ba and in that it is secured to the fixed window pane 12 by an over-molded material 50.

This over-molded material 50 extends onto the inner surface of the exterior wall 18bb, the downward surface of the lateral wall 18ac and also over the edge 14ca and portions of the surfaces 14a, 14b of the fixed window pane 14. This over-molded material 50 may have lips or legs intended to abut against parts of the vehicle.

FIG. 6 shows a longitudinal profile which is called "second" profile 20. This second profile 20 extends along said edge 14cd and is over-molded.

The second profile 20 shown in FIG. 6 is U-shaped in cross section and defines a longitudinal groove 32 that is oriented inwardly and is configured to receive a metallic flange 34 of the motor vehicle. In the example shown, the metallic flange 34 includes two substantially vertical panels that are superimposed and inserted into the groove 32.

The second profile 20 includes an exterior wall 20a and two lateral walls 20b, 20c connected by said exterior wall 20a. The exterior wall 20a is usually parallel to the interior surface 14b of the fixed window pane 14 and is secured thereto by an over-molded material 36. In the example shown, the exterior wall 20a faces the interior surface 14b and spaced therefrom. This space S is filled in with said over-molded material 36.

The lateral wall 20b is substantially aligned with a portion (the rear edge 14cd in the example shown) of said peripheral edge 14c in a plane P1 that is perpendicular to the fixed window pane 14. The lateral wall 20c extends perpendicularly to and faces the interior surface 14b.

In the example shown, the over-molded material 36 further extends over the lateral wall 20c and the frond edge 14cd. The lateral wall 20b is free of such over-molded material 36. Said over-molded material 36 is V-shaped (with an angle lower than 90°) in front of the rear edge 14cd and defines a first planar surface 36a aligned with the exterior surface 14a and a second planar surface 36b which extends between the first surface 36a and the profile 20 and is inclined with respect to said plane P1.

The second profile 20 includes sealing or retention lips intended to cooperate with parts of the vehicle.

FIG. 7 shows another longitudinal profile which is called "first" profile 22, also known as division post. This first profile 22 extends substantially vertically along said edges 12cd, 14cb and is over-molded.

The first profile 22 shown in FIG. 7 is U-shaped in cross section and defines a longitudinal groove 38 that is oriented forwardly and is configured to receive a guiding mean or guide 40 secured to the movable window pane 12.

The first profile 22 includes an exterior wall 22a and an interior wall 22b connected together by a lateral wall 22c and defining the groove therebetween. The exterior wall 22*a* is parallel to the interior surface 14*b* of the fixed window pane 14 and is secured thereto by an over-molded material 42. In the example shown, the exterior wall 22*a* faces the interior surface 14*b* and is L-shaped in cross section. The exterior wall 22*a* includes first and second parts 22*aa*, 22*ab* that are perpendicular to one another, said first part 22*aa* being spaced from the interior surface 14*b* and extending between said lateral wall 22*c* and said second part 22*ab*. Said second part 22*ab* is applied directly onto said interior surface 14*b*. Said first part 22*ab* defines a space S with said interior surface 14*b* that is filled in with the over-molded material 42.

The over-molded material 42 further extends over at least a portion of said lateral wall 22*c*. The over-molded material 42 does not cover the peripheral edge 14*cb* along said first profile 22, i.e., the front edge 14*cb*, in the example shown.

The exterior wall 22*a* has a longitudinal edge 22*a*1 which is opposite to the lateral wall 22*c* that is substantially aligned with said front edge 14*cb* in a plane P2 that is perpendicular to the fixed window pane 14.

This longitudinal edge 22*a*1 carries a first sealing lip 44 which is configured to abut against both edges 14*cb* and 12*cd*. The sealing lip 44 is the sole member extending between said edges 14*cb* and 12*cd*. The sealing lip 44 is curved (concave or convex) and defines a groove oriented inwardly. The lip 44 includes a longitudinal connecting edge 44*a* which extends in the plane P2 and is secured to the longitudinal edge 22*a*1, and further includes an opposite longitudinal sealing edge 44*b* abutting against the rear edge 12*cd* of the pane 12. The longitudinal portion of the sealing lip 44 extending between both edges 44*a*, 44*b* has an exterior surface 44*c* which is substantially aligned with said exterior surfaces 14*a*, 12*a*.

As far as the interior wall 22*b* of the first profile 22 is concerned, it crosses said plane P2 and is configured to face said guiding mean 40, and preferably also to face the interior surface 12*b* of the movable window pane 12 as shown in the figure.

The interior wall 22*b* carries a second sealing lip 46 which is configured to be in sealing contact with the guiding mean 40. In another example, only the first and the third sealing lips may be provided (no sealing is then provided on the guiding mean 40).

The guiding mean 40 may be formed of a single longitudinal part that is secured, for instance by gluing or over-molding, onto the interior surface 12*b* of the pane 12 and includes a guiding leg 40*a* crossing the plane P2 and received into the groove 38 for sliding motion. As shown in the drawings, the surfaces of the groove 38 may be coated with an antifriction layer suitable to cooperate by sliding with the guiding mean 40 and in particular its leg 40*a*. Therefore, as shown in the drawings, the walls 22*a*, 22*b*, 22*c* may be coated with the antifriction layer inside the groove 38.

As shown in FIGS. 4 to 7, each profile 18, 20, 22 may comprise at least one U-shaped metallic rail embedded or encapsulated into a polymeric covering. The rail includes an interior branch and an exterior branch, connected together by a lateral branch. Each profile and its polymeric covering may be made by co-extrusion. The sealing lips may be made of an elastically deformable material, such as for example EPDM or thermoplastic. These lips may be obtained by over-molding during a process where the profiles 18, 20, 22 are connected together in their interconnection zones. Of course, each profile might not comprise metallic rail and might therefore comprise only polymeric materials. Each profile may have polypropylene in areas where material rigidity is needed and the lips might be made of a softer material. The profiles are secured onto the fixed window pane 14 by over-molding by means of the over-molded material 36, 42 and 50. Stationary glass edge 14*cc* is usually encapsulated as well.

Figure 8:
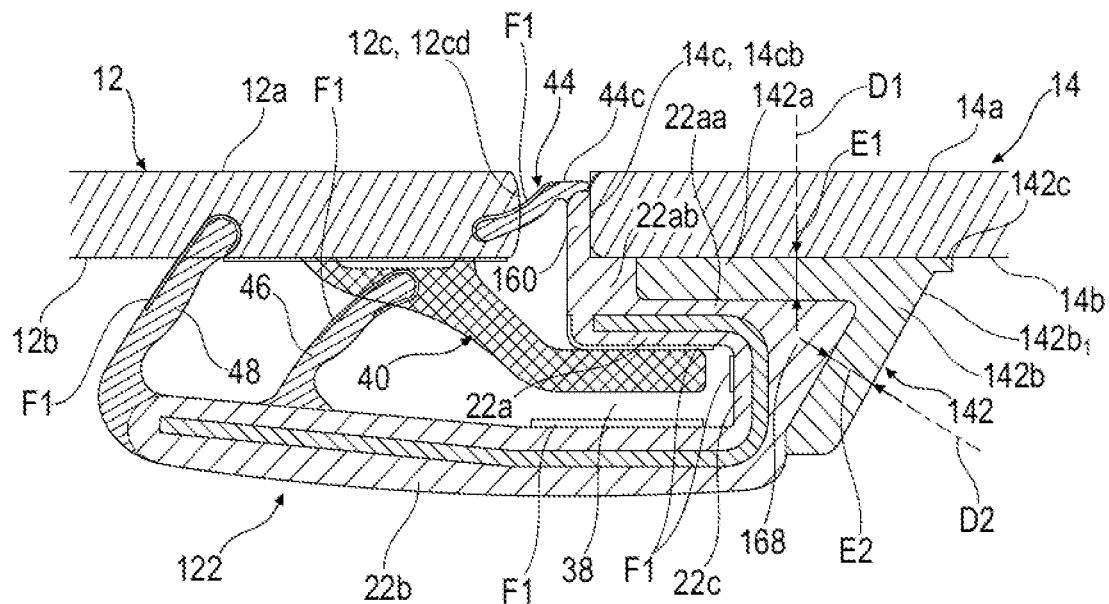
FIG. 8 is a cross sectional view similar to FIGS. 1 and 7 and showing a first embodiment of the encapsulated fixed window module according to the invention.

FIG. 8 is a view similar to the view of FIGS. 2 and 7 and shows a first embodiment according to the invention.

The invention relates to an encapsulated fixed window module which is similar to the encapsulated window module described above in relation with FIGS. 3 to 6. The above description made in reference to FIGS. 3 to 6 applies therefore to the claimed invention and the description of FIG. 7 of the former embodiment may be replaced by the following description of FIG. 8 which illustrates the first embodiment of the invention.

The reference numerals used in relation to FIGS. 3 to 7 are used for designating the same elements in FIG. 8.

The window panes 12 and 14 are similar to the ones disclosed above. The guiding mean 40 is also similar.

The (first) profile 122 or division post of FIG. 8 extends along the edges 12*cd*, 14*cb* and is over-molded.

The profile 122 shown in FIG. 7 is U-shaped in cross section and defines a longitudinal groove 38 that is oriented forwardly and is configured to receive the guiding mean 40 secured to the movable window pane 12.

The profile 122 includes an exterior wall 22*a* and an interior wall 22*b* connected together by a lateral wall 22*c* and defining the groove 38 therebetween. The exterior wall 22*a* is parallel to the interior surface 14*b* of the fixed window pane 14 and is secured thereto by an over-molded material 142.

As shown in the drawings, the surfaces of the groove 38 may be coated with an antifriction layer F1 suitable to cooperate by sliding with the guiding mean 40 and in particular its leg 40*a*. Therefore, as shown in the drawings, the walls 22*a*, 22*b*, 22*c* may be coated with the antifriction layer F1 inside the groove 38.

The exterior wall 22*a* has a surface 22*a*1 that faces the interior surface 14*b* and is L-shaped in cross section. The exterior wall 22*a* includes first and second parts 22*aa*, 22*ab* that are perpendicular one another, said first part 22*aa* being spaced from the interior surface 14*b* and extending between said lateral wall 22*c* and said second part 22*ab*. Said second part 22*ab* is applied directly onto said interior surface 14*b* in the vicinity of the edge 14*c*, 14*cb*.

Said second part 22*ab* carries a protruding leg 160 which extends externally in a direction substantially perpendicular to the exterior wall 22*a*. The protruding leg 160 is interposed in the gap between both peripheral edges 12*cb*, 14*cb*, and is in abutment against the peripheral edge 14*cb*. The protruding leg 160 carries a first sealing lip 44 which is configured to abut against the edge 12*cb*. The first sealing lip 44 has an exterior surface 44*c* which is substantially aligned with the exterior surfaces 14*a*, 12*a*.

The protruding leg 160 is made of the same material as the main material (or polymeric covering) of the profile 122. The first sealing lip 44 is preferably made of a softer material.

The exterior wall 22*a*, and in particular its first part 22*aa*, defines a space S with the interior surface 14*b* that is filled in with the over-molded material 142 and in particular with a first portion 142*a* of this over-molded material 142.

The over-molded material 142 further extends over at least a portion of said lateral wall 22*c* and comprises a second portion 142*b* extending between the lateral wall 22*c* and the interior surface 14b. The over-molded material 142 does not cover the peripheral edge 14cb in the example shown.

As far as the interior wall 22b of the first profile 22 is concerned, it is longer than the exterior wall 22a and is configured to face said guiding mean 40, and preferably also to face the interior surface 12b of the movable window pane 12 as shown in the figure.

The interior wall 22b carries a second sealing lip 46 which is configured to be in sealing contact with the guiding mean 40, and a third sealing lip 48 which is configured to be in sealing contact with the interior surface 12b of the movable window pane 12.

Sealing lips 44, 46 and 48 may be coated with antifriction layers F1.

In another example, only the first and the third sealing lips may be provided (no sealing is then provided on the guiding mean 40).

The profile 122 may comprise at least one U-shaped metallic rail embedded or encapsulated into a polymeric covering. This rail may include a first branch extending into the exterior wall 22b, a second branch extending into the interior wall 22a, and a connecting branch extending into the lateral wall 22c.

The profile 122 and its polymeric covering may be made by co-extrusion. The sealing lips may be made of an elastically deformable material, such as for example EPDM or thermoplastic. These lips may be realized by over-molding or co-extrusion. Of course, the profile 122 might not comprise metallic rail and might therefore comprise only a polymeric material. The polymeric or covering material of the profile 122 may be a thermoplastic or an elastomer thermoplastic, such as for instance polypropylene. The over-molded material is for instance made of thermoplastic, elastomer thermoplastic, EPDM, SEBS, etc.

As shown in FIG. 8, the first portion 142a of the over-molded material 142 has a first thickness E1 which is constant along a major portion of this first portion. The thickness E1 of this first portion 142A is measured in a direction which is perpendicular to the interior surface 14B of the fixed window pane 14 and which is also perpendicular to the exterior wall 22a.

The second portion 142b of the over-molded material 142 has a second thickness E2 which is constant along a major portion of the second portion. The thickness E2 of this second portion 142b is measured in a direction which is perpendicular to the lateral wall 22c.

This second portion 142b has an outer face 142b1 which extends between the lateral wall 22c and the interior surface 14b and which includes a major portion which is inclined with respect to the interior surface 14b.

Figure 9A:
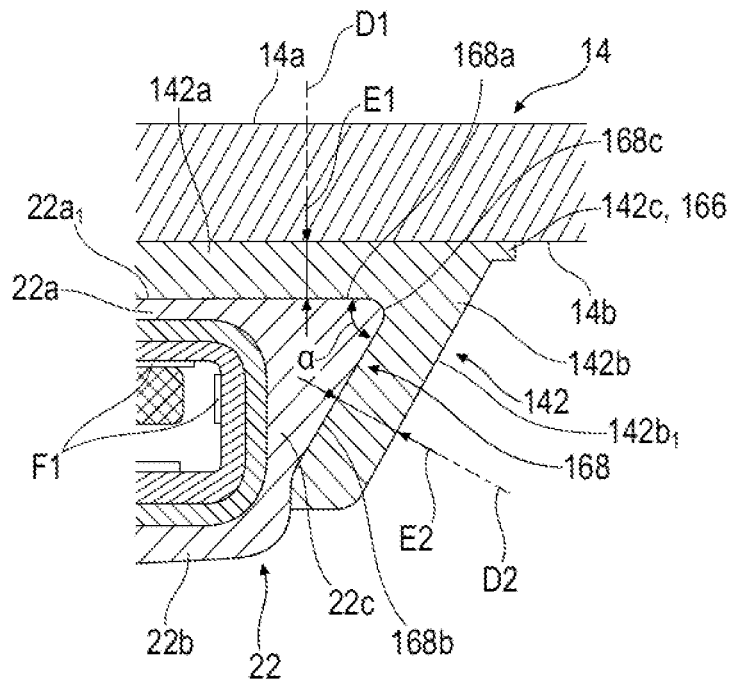
FIG. 9*a* is an enlarged view of a detail of FIG. 8.
Figure 9B:
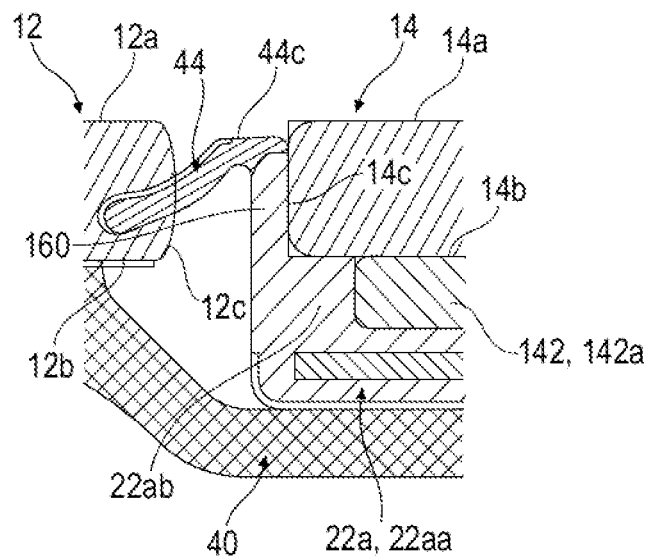
FIG. 9*b* is an enlarged view of another detail of FIG. 8.

In the shown example, the over-molded material 142 is V-shaped and includes both portions 142a, 142b connected therebetween and forming together a tip 142c. The over-molded material 142 includes a protruding rib 166 on its tip 142c, this protruding rib 166 extending on the interior surface 14b (FIG. 9a).

In the example shown, the shape of the over-molded material is provided by the shape of the profile 122 which includes a tooth 168 or a fin (such as a shark fin) on its lateral wall 22c.

The tooth 168 includes a first surface 168a parallel to the interior surface 14b and aligned with the surface 22a1 of the exterior wall 22a, and a second surface 168b which is inclined with respect to the interior surface 14b. The function of tooth 168 is to create a constant offset between the second surface 168b and the outer face 142b1. The shape and location of the surface 168b will thus evolve according to the shape and location of the outer face 142b1. The thickness E2 of the second portion 142b may be measured in a direction which is perpendicular to this second surface 168b.

The tooth 168 is preferably fully embedded into the over-molded material so that the first portion 142a extends between the first surface 168a and the interior surface 14b and the second portion 142b extends between the second surface 168b and the interior surface 14b. The first surface 168a is planar and the second surface 168b is also planar in the example shown. This second surface 168b is preferably parallel to the outer face 142b1 to ensure that E2 is constant. The first and second surfaces 168a, 168b are therefore V-shaped in cross section in the example shown. The first and second surfaces 168a, 168b form an angle α or form a tip having an angle which is comprised between 20 and 85°, and preferably between 50 and 70°. In other words, the tooth 168 defines an angle α comprised between 20 and 85°, and preferably between 50 and 70°.

FIGS. 10a to 10e show further embodiments of the invention.

Figure 10A:
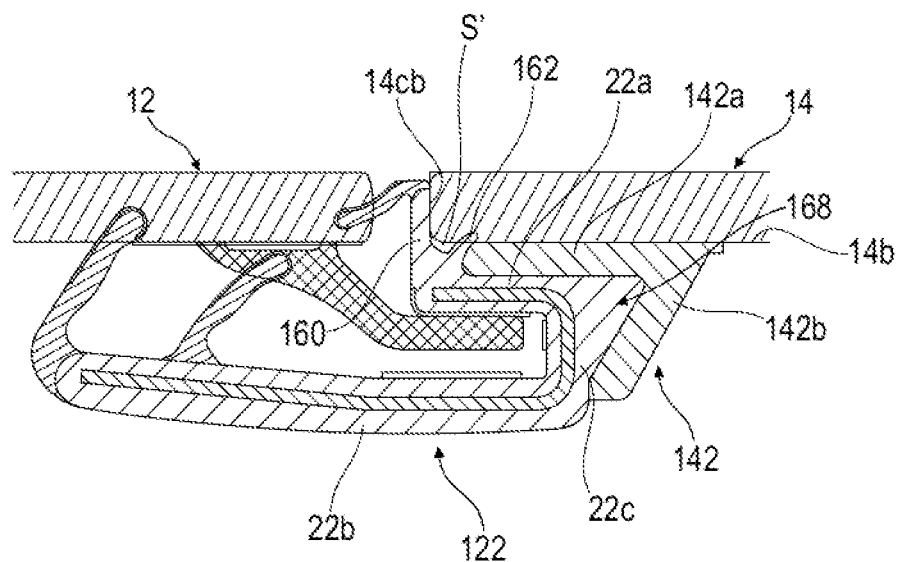
FIGS. 10*a* to 10*i* are views corresponding to the view of FIG. 8 and showing further embodiments of the invention.

The embodiment of FIG. 10a differs from the embodiment of FIG. 8 in that the second part 22ab of the exterior wall 22a is replaced by a protruding lip 162 which extends externally and which is in abutment against the interior surface 14b of the window pane 14.

The protruding lip 162 and the protruding leg 160 may be made of the same material as the main material of the profile 122. The first sealing lip 44 is made of a softer material.

The over-molded material 142 does not cover the peripheral edge 14cb. This is due to the presence of the protruding lip 162 which abuts against the pane 14 and avoid over-molded material 142 passing through the lip 162 and up to the edge 14cb.

As shown in the drawings, the protruding lip 162 and leg 160 may define together and with the pane 14 a space S' that is empty, i.e., that is not filled with over-molded material 142.

Figure 10B:
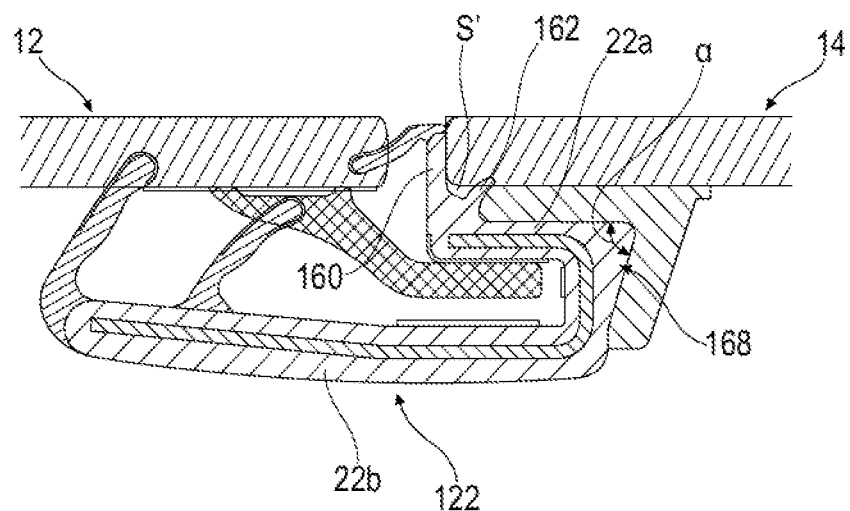

The embodiment of FIG. 10b differs from the embodiment of FIG. 8 in that the tooth 168 defines a larger angle α of about 70-85°. The V-shape of the over-molded material 142 has a similar angle.

Figure 10C:
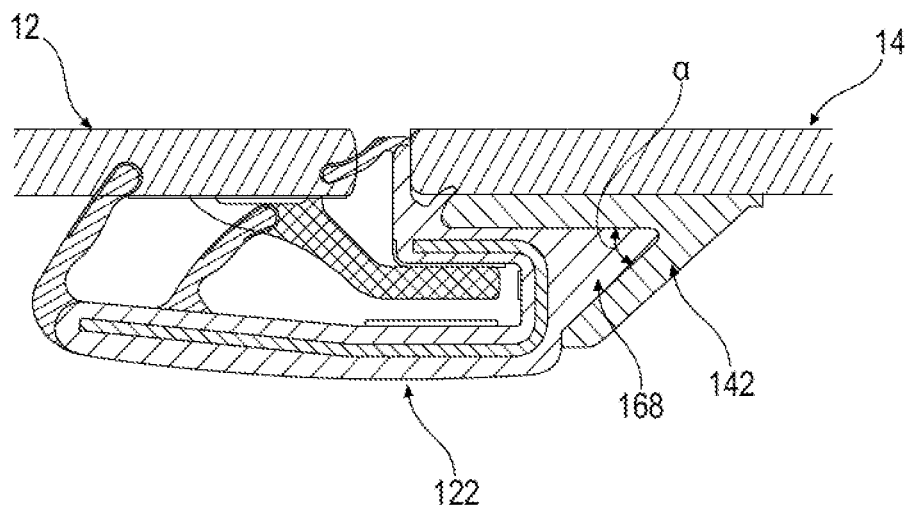

The embodiment of FIG. 10c differs from the embodiment of FIG. 8 in that the tooth 168 defines a small angle α of about 20-40°. The V-shape of the over-molded material 142 has a similar angle.

Figure 10D:
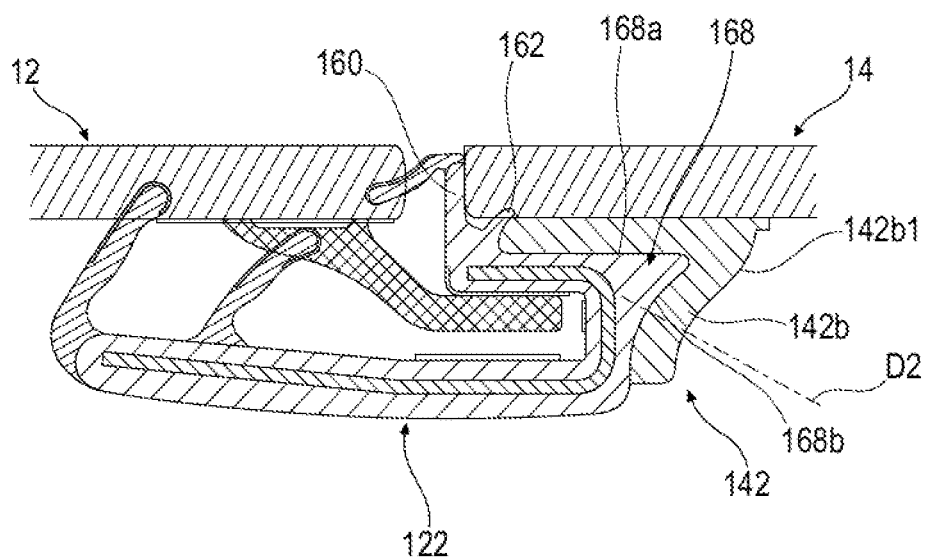

The embodiment of FIG. 10d differs from the embodiment of FIG. 8 in that the second surface 168b of the tooth 168 is curved and in particular is concave. The second portion 142b of the over-molded material 142 conforms to the shape of this second surface 168b and has a curved shape. Similarly, the outer face 142b1 of the over-molded material 142 is curved and concave to get a thickness E2 as constant as possible.

Figure 10E:
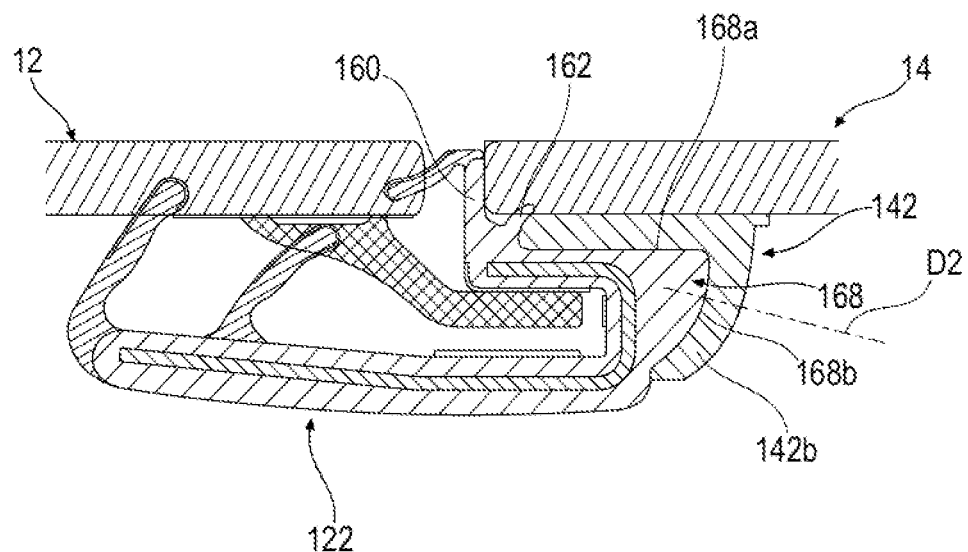

The embodiment of FIG. 10e differs from the embodiment of FIG. 8 in that the second surface 168b of the tooth 168 is curved an in particular convex. The second portion 142b of the over-molded material 142 conforms to the shape of this second surface 168b and has a curved shape. Similarly, the outer face 142b1 of the over-molded material 142 is curved and convex to get a thickness E2 as constant as possible.

Figure 10F:
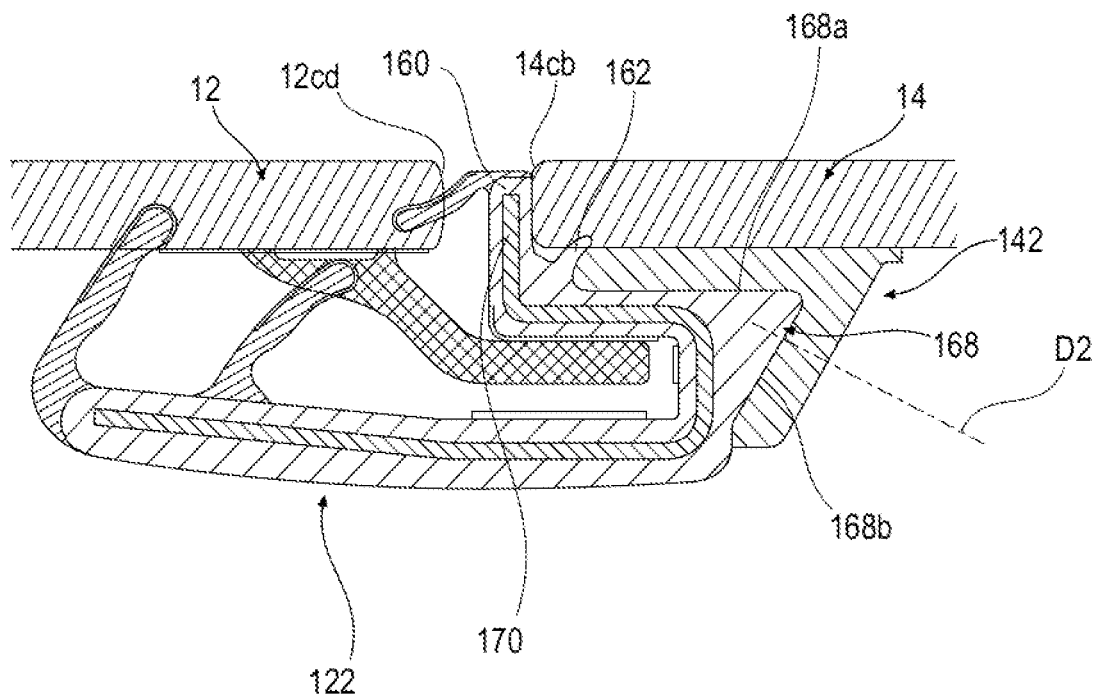

The embodiment of FIG. 10f differs from the embodiment of FIG. 8 in that the metallic rail embedded or encapsulated into the polymeric covering includes a leg 170 at its edge opposite the connecting branch. This leg 170 extends outwardly and is interposed between the edges 12cd and 14cb.

Figure 10G:
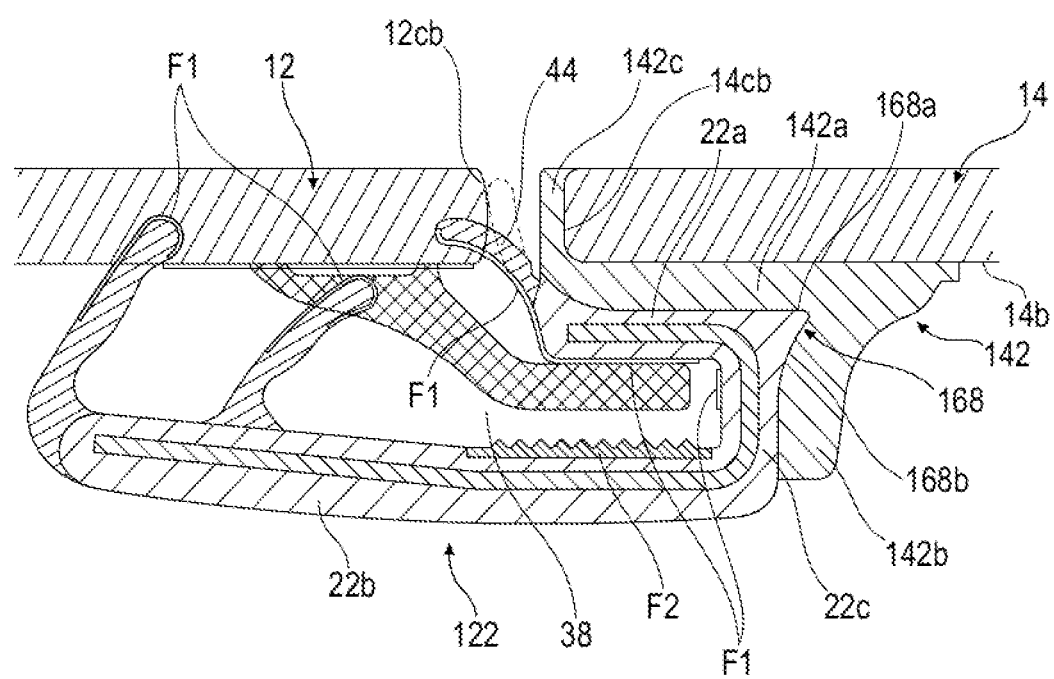

The embodiment of FIG. 10g differs from the embodiment of FIG. 8 in that over-molded material 142 comprises a third portion 142c, the first portion 142a extending between the third and second portions 142c, 142b.

The third portion 142c extends on the peripheral edge 14cb of the fixed pane 14. The third portion 142c is perpendicular to the first portion 142a and extends outwardly from the end of the first portion 142a which is opposite to the second portion 142b. The third portion 142c covers entirely the peripheral edge 14cb in the example shown.

Therefore, the profile 122 is not directly in contact with the pane 14. Its exterior wall 22b is remote from the interior surface 14b and is separated therefrom by the over-molded material 142.

The first sealing lip 44 of the profile 122 is configured to abut against edge 12cd. The third portion 142c and the sealing lip 44 are both located between the edges 14cb and 12cd.

As shown, the third portion 142c may include an end which is coplanar with said exterior surfaces of said panes 12, 14.

The embodiment of FIG. 10g further differs in that the antifriction layer on the exterior surface of the interior wall 22a of the profile 122 is replaced by a co-extruded thermoplastic material and/or a cellular or foam material F2. This material is used to prevent rattle noise/tapping noise during door slam. The material F2 has for instance a shore A hardness of about 25-60 and/or a coefficient of friction less than about 0.6. All the embodiments described above may have such material in the groove 38 instead of one of the antifriction layers F1.

Figure 10H:
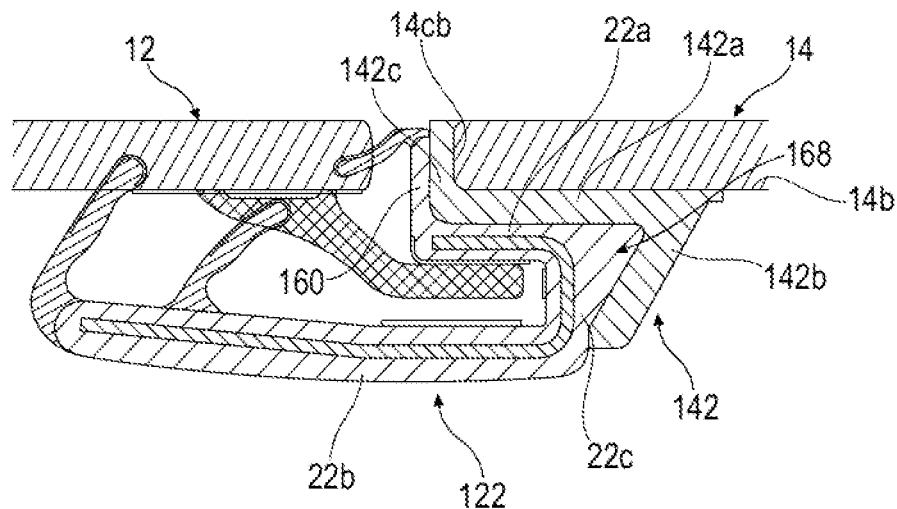

In another embodiment shown in FIG. 10h, the third portion 142c of FIG. 10g may be combined with the leg 160 of any of the preceding embodiments (FIG. 8 to FIG. 10g) and may therefore be interposed between the peripheral edge 14cb of the pane 14 and this leg 160.

Generally speaking, the third portion 142c is advantageous because it allows simplifying the mold that is used to perform the encapsulation. Moreover, it enhances the sealing during molding at the connecting area between the edges 14cb, 14ca (cf. FIG. 3).

Figure 10I:
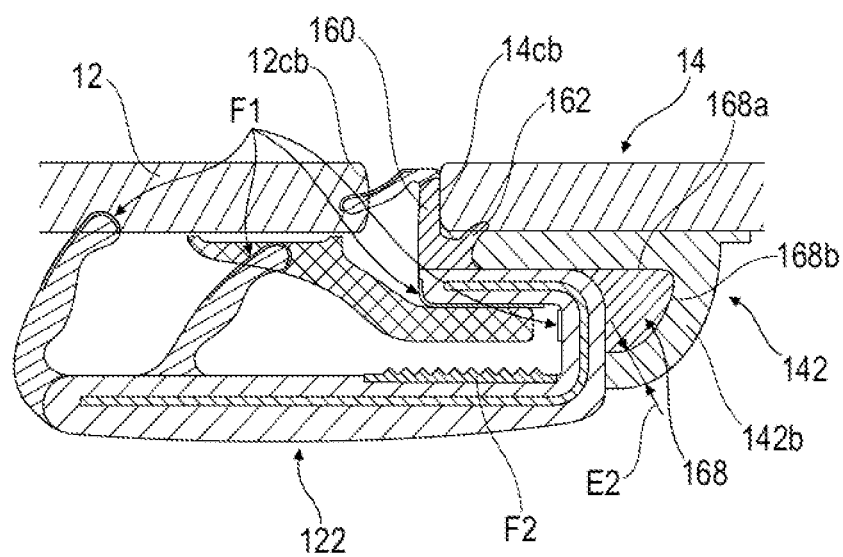

In another embodiment shown in FIG. 10i, the tooth 168 is made of a material which is different from the main (co-extruded or covering) material of the profile 122. For instance, the main material of the profile 122 is harder than the material of the tooth 168. The main material is for instance a PP. The material of the tooth 168 may have a Shore A hardness of between 70-95, and for instance of about 85. The material of the tooth 168 is for instance a TPE.

The protruding leg 160 and the protruding lip 162 may also be made of a material which is different from the main material of the profile 122. The materials of the leg 160, of the lip 162 and of the tooth 168 may be the same.

Even if the tooth 168 and/or the protruding leg 160 and/or the protruding lip 162 may be made of different material, they are preferably made by co-extrusion with the profile 122. Use of a softer material for the protruding leg 160 for instance enhances the molding operation.

The second portion 142b extends on the tooth 168 and has an end linked to the profile 122. This portion 142b has a constant thickness E2 up to this end.

In the embodiment of FIG. 10i, both branches of the metallic rail of the profile 122 are straight while in the embodiments of FIGS. 10a-10h the exterior branch of the metallic rail is slightly inclined and has an end opposite its lateral branch which protrudes inwardly.

In all the embodiments, the esthetic appearance of the window module may be enhanced by lying flush the outside surfaces 12a, 14a of the fixed and movable window panes 12, 14. The exterior surfaces 12a, 14a of the panes 12, 14 may be therefore substantially coplanar. These surfaces 12a, 14a mays also be flush with the exterior surface 44c (cf. FIGS. 8 to 10f), and/or with the end of the leg 160 (FIGS. 8 to 10f), and/or with the end of the third portion 142c of the over-molding material 142 (FIGS. 10g and 10h).

The invention claimed is:

1. An encapsulated fixed window module for a motor vehicle, comprising:
a fixed window pane having an exterior surface, an interior surface, and a peripheral edge extending between said exterior and interior surfaces,
at least one division post extending along at least a portion of said peripheral edge, said division post comprising a first longitudinal profile which is U-shaped in cross section and which has an exterior wall, an interior wall, and a lateral wall connecting said exterior and interior walls, said first profile defining a longitudinal groove configured to receive a guiding mean carried by a movable window pane, said exterior wall facing said interior surface, and
an over-molded material securing said first profile to said fixed window pane, said over-molded material comprising a first portion extending between said exterior wall and said interior surface and a second portion extending between said lateral wall and said interior surface, said first and second portions being connected one to the other, said first portion having a first thickness E1 which is constant along a major portion of said first portion, said second portion having an outer face which extends between the lateral wall and said interior surface and which includes a major portion which is inclined with respect to said interior surface,
wherein said second portion has a second thickness E2 which is constant along a major portion of said second portion.

2. The encapsulated fixed window module as claimed in claim 1, wherein said lateral wall comprises a tooth which includes a first surface parallel to said interior surface, and a second surface which is inclined with respect to said interior surface, said first portion extending between said first surface and said interior surface and said second portion extending between said second surface and said interior surface.

3. The encapsulated fixed window module as claimed in claim 2, wherein said first surface is planar and said second surface is planar, concave or convex.

4. The encapsulated fixed window module as claimed in claim 2, wherein said second surface is mainly parallel to said outer surface or provides a constant offset when this second surface is concave or convex.

5. The encapsulated fixed window module as claimed in claim 2, wherein said first and second surfaces are V-shaped in cross section.

6. The encapsulated fixed window module as claimed in claim 2, wherein said tooth has a tip having an angle comprises between 2° and 85°.

7. The encapsulated fixed window module as claimed in claim 1, wherein said over-molded material is V-shaped.

8. The encapsulated fixed window module (10) as claimed in claim 1, wherein $0.8 \cdot E1 \leq E2 \leq 1.2 \cdot E1$, in which E1 and E2 are respectively said first and second thicknesses.

9. The encapsulated fixed window module as claimed in claim 1, wherein said exterior wall comprises a longitudinal end opposite said lateral wall, said longitudinal end comprising a protruding leg which is perpendicular to the exterior wall and is in abutment against said peripheral edge.

10. The encapsulated fixed window module as claimed in claim 9, wherein said protruding leg carries a first sealing lip which is configured to abut against a peripheral edge of said movable window pane.

11. The encapsulated fixed window module as claimed in claim 9, wherein said longitudinal end and/or said exterior wall carries a protruding lip which abuts against said interior face and which is in contact with said over-molded material.

12. The encapsulated fixed window module as claimed in claim 11, wherein an empty space is defined between said fixed window pane on one hand, and said protruding leg and lip on the other hand.

13. The encapsulated fixed window module as claimed in claim 1, wherein said first profile comprises an embedded metallic rail which includes a leg extending outwardly and facing said peripheral edge.

14. The encapsulated fixed window module as claimed in claim 13, wherein said over-molded material further comprises a third portion which is connected to the first portion and which is interposed between said leg and said peripheral edge.

15. The encapsulated fixed window module as claimed in claim 1, wherein said over-molded material further comprises a third portion which is connected to the first portion, said third portion extending perpendicularly to the first portion and on said peripheral edge.

16. The encapsulated fixed window module as claimed in claim 15, wherein said third portion includes an end which is coplanar with said exterior surface of said fixed window pane.

17. A motor vehicle, comprising at least one encapsulated fixed window module as claimed in claim 1.

18. The motor vehicle as claimed in claim 17, which comprises a door including a door frame, a movable window pane, and said encapsulated fixed window module, said movable window pane having an exterior surface, an interior surface, and a peripheral edge extending between said exterior and interior surfaces, wherein said exterior surfaces of said encapsulated fixed window module and of said movable window pane are substantially coplanar.

* * * * *